United States Patent
Nelson et al.

(10) Patent No.: US 12,419,293 B1
(45) Date of Patent: Sep. 23, 2025

(54) JUG FISHING WITH LIGHTS

(71) Applicants: James Nelson, Coker, AL (US); Kevin Jackson, Coker, AL (US)

(72) Inventors: James Nelson, Coker, AL (US); Kevin Jackson, Coker, AL (US)

(*) Notice: Subject to any disclaimer, the term of this patent is extended or adjusted under 35 U.S.C. 154(b) by 0 days.

(21) Appl. No.: 18/764,307

(22) Filed: Jul. 4, 2024

(51) Int. Cl.
*A01K 93/02* (2006.01)
*A01K 89/08* (2006.01)

(52) U.S. Cl.
CPC .............. *A01K 93/02* (2013.01); *A01K 89/08* (2013.01)

(58) Field of Classification Search
CPC ....................................................... A01K 93/02
See application file for complete search history.

(56) References Cited

U.S. PATENT DOCUMENTS

| | | | | |
|---|---|---|---|---|
| 541,789 A * | 6/1895 | Kunzelman | ............ | A01K 93/00 43/43.11 |
| 2,179,878 A * | 11/1939 | Dietrich | ................. | A01K 93/02 362/205 |
| 2,190,113 A * | 2/1940 | Chreitzberg | ............ | A01K 93/00 43/43.11 |
| 2,448,681 A * | 9/1948 | Nutter | .................... | A01K 93/02 362/802 |
| 2,490,669 A * | 12/1949 | Burke | .................... | A01K 93/02 362/253 |
| 2,869,274 A * | 1/1959 | Seigle | ................... | A01K 93/02 43/17 |
| 2,871,607 A * | 2/1959 | Carraway | .............. | A01K 93/02 43/17 |
| 3,010,238 A * | 11/1961 | Crumrine, Jr. | ......... | A01K 91/06 43/43.11 |
| 3,255,549 A * | 6/1966 | Riley | ...................... | A01K 93/00 43/43.11 |
| 3,340,644 A * | 9/1967 | Lintz | ..................... | A01K 93/00 43/43.11 |
| 4,251,941 A * | 2/1981 | Howard | .................. | A01K 93/00 43/43.11 |
| 4,574,515 A * | 3/1986 | Garner | .................... | A01K 93/00 43/43.11 |
| 4,825,580 A * | 5/1989 | Gray | ..................... | A01K 91/10 43/43.11 |
| 5,036,615 A | 8/1991 | Lu | | |
| 5,233,781 A * | 8/1993 | Bigelow | ............... | A01K 93/00 43/17 |

(Continued)

FOREIGN PATENT DOCUMENTS

| | | | | |
|---|---|---|---|---|
| CN | 111587856 A | * | 8/2020 | ............ A01K 93/02 |
| KR | 20220109827 A | * | 8/2022 | |

*Primary Examiner* — Morgan T Jordan
(74) *Attorney, Agent, or Firm* — Sanchelima & Associates, P.A.; Jesus Sanchelima; Christian Sanchelima

(57) ABSTRACT

A jug fishing with lights including a housing assembly, a reel assembly and an electronic assembly. The housing includes a flotation housing. The reel assembly includes a spool and a fishing line. The electronic assembly includes a light and a sensor. The flotation housing has a cylindrical shape. The flotation housing is hollow. The spool is attached to inner walls of the flotation housing. The fishing line is wounded on the spool. The flotation housing floats in water having the fishing line extending downwards from the housing float. The sensor is attached to the spool. The sensor detects rotation in the spool to turn on the light.

7 Claims, 3 Drawing Sheets

(56) References Cited

U.S. PATENT DOCUMENTS

| | | | | |
|---|---|---|---|---|
| 5,440,831 | A * | 8/1995 | Chandler | A01K 93/00 43/43.11 |
| 5,829,181 | A | 11/1998 | Fielder | |
| 6,763,629 | B1 * | 7/2004 | Bennett | A01K 89/08 43/43.11 |
| 6,854,207 | B1 * | 2/2005 | Strope | A01K 89/08 43/43.11 |
| 6,880,285 | B1 * | 4/2005 | Frost | A01K 93/00 43/43.11 |
| 12,185,709 | B1 * | 1/2025 | Myers | A01K 97/125 |
| 2002/0166282 | A1 * | 11/2002 | Izzard | A01K 91/10 43/44.91 |
| 2007/0277424 | A1 * | 12/2007 | Hale | A01K 89/08 43/43.11 |
| 2009/0105952 | A1 * | 4/2009 | Grace | G01C 21/005 701/300 |
| 2010/0269397 | A1 * | 10/2010 | Hale | A01K 89/08 43/4.5 |
| 2014/0090288 | A1 * | 4/2014 | Freeman | A01K 93/00 43/26.1 |
| 2015/0113853 | A1 * | 4/2015 | McKeough | A01K 97/125 702/41 |
| 2019/0072951 | A1 * | 3/2019 | Clark | A01K 91/06 |
| 2024/0260558 | A1 * | 8/2024 | Ingram | A01K 93/00 |

* cited by examiner

JUG FISHING WITH LIGHTS

BACKGROUND OF THE INVENTION

1. Field of the Invention

The present invention relates to a jug fishing with lights and, more particularly, to a jug fishing with lights that is adapted to alert when the fishing line moves indicating that a fish is hooked.

2. Description of the Related Art

Several designs for jug fishing have been designed in the past. None of them, however, include a light positioned atop of the jug fishing, where the light turns on and turns off when movement in the fishing line is detected.

Applicant believes that a related reference corresponds to U.S. Pat. No. 5,829,181 issued for a jug fishing apparatus and signaling device that can include an illumination device such as a light bulb, or an audible signal. Applicant believes that another related reference corresponds to U.S. Pat. No. 5,036,615 issued for an electric fishing float with flash indicators. None of these references, however, teach of a jug fishing device comprising a cylindrical float having a line spool and reel, a retractable line, an LED and motion sensor, and a cell phone app for linking with the device.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a jug fishing with lights that includes a transmitter to transmit a signal to an external device when movement is detected in the fishing line.

It is another object of this invention to provide a jug fishing with lights that includes a spool attached within a housing of the jug fishing.

It is still another object of the present invention to provide a jug fishing with lights that includes at positioning system to indicate position of the jug fishing.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
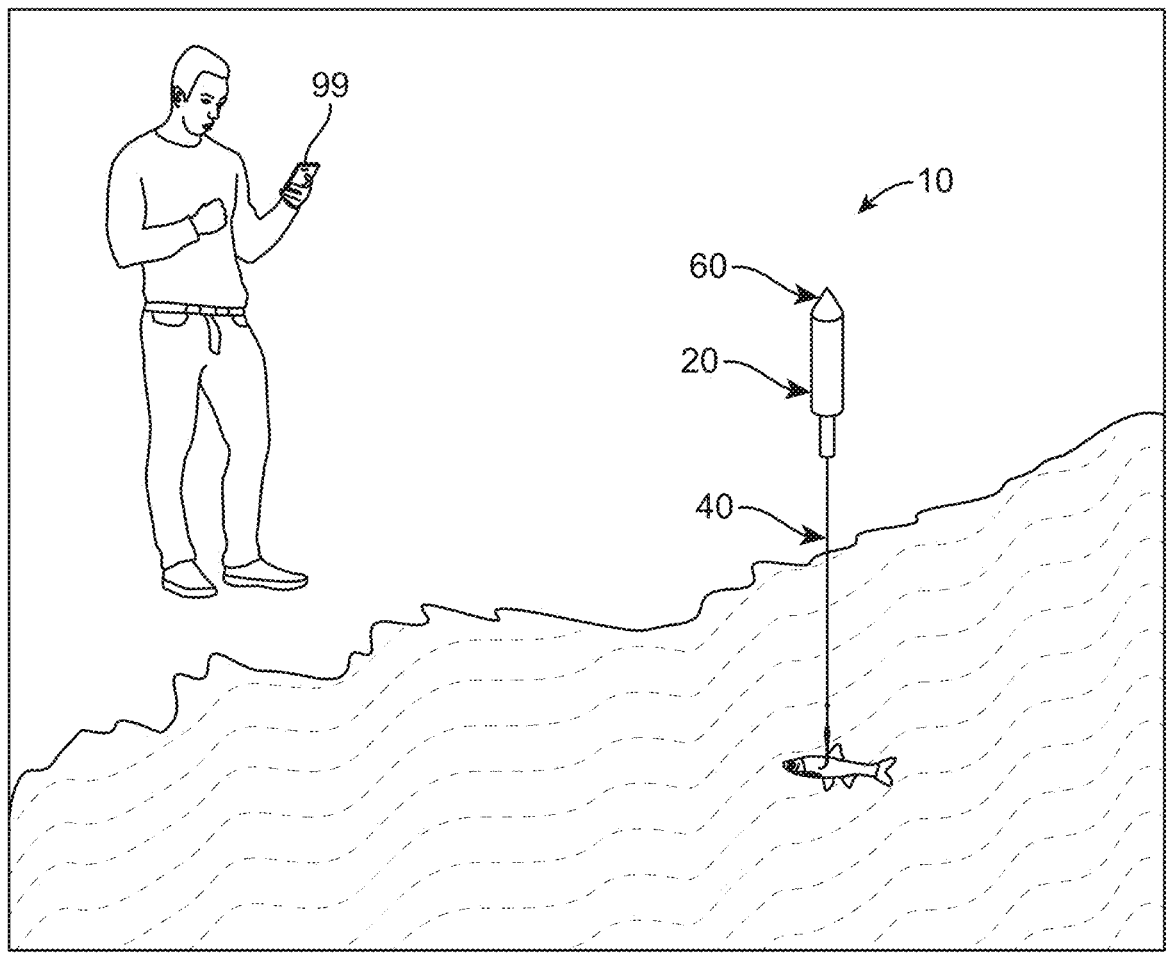
FIG. 1 represents an isometric operational view of the present invention 10 transmitting an alert signal to an external device 99. The present invention 10 includes a housing assembly 20, a reel assembly 40 and an electronic assembly 60.

Referring now to the drawings, where the present invention is generally referred to with numeral 10, it can be observed that it basically includes a housing assembly 20, a reel assembly 40 and an electronic assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 2:
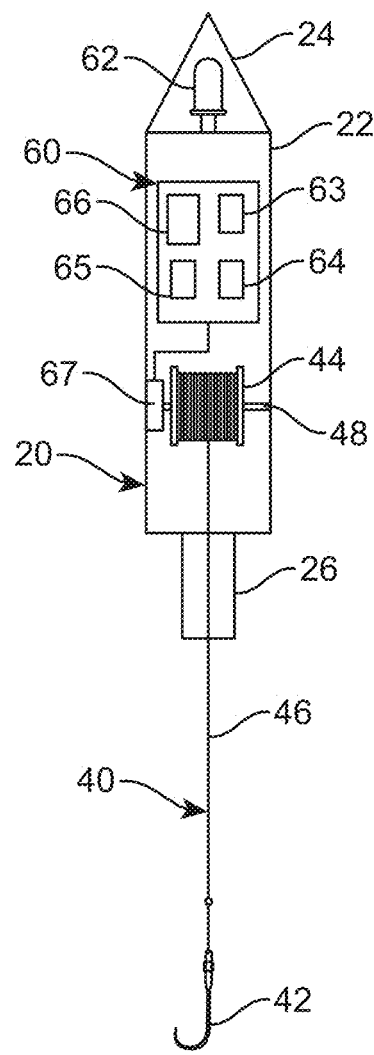
FIG. 2 shows a see-through view of the present invention 10 showing elements of the electronic assembly 60.

As best illustrated in FIG. 2 the housing assembly 20 may include a flotation housing 22, a light housing 24, and a bottom housing 26. The flotation housing 22 may be hollow. In a preferred embodiment, the flotation housing 22 may be made of polyethylene foam. It also may be suitable for the flotation housing 22 to be made of polyvinyl chloride or any other light weight material. In a preferred embodiment the flotation housing 22 may have a cylindrical shape. It also may be suitable for the flotation housing 22 to have a rectangular shape, a triangular shape, or any other suitable shape. The flotation housing 22 may have a top wall, a bottom wall with an opening and sidewalls.

In a preferred embodiment the light housing 24 may have a conical shape. It also may be suitable for the light housing 24 to have a cylindrical shape, a rectangular shape, or any other suitable shape. The light housing 24 may be attached to the top wall of the flotation housing 22. The bottom housing 26 may be attached to the bottom wall of the flotation housing 22. In a preferred embodiment, the bottom housing 26 and the light housing 24 may be made of a plastic material including but not limited to polyvinyl chloride. The bottom housing 24 may have a tubular shape. The bottom housing 24 may be hollow. The bottom housing 24 may have a diameter smaller than a diameter of the flotation housing 22.

The reel assembly 40 may include a hook 42, a spool 44, and a fishing line 46. The spool 44 may be made of plastic, graphite, metal, or any other suitable material. The spool 44 may have a cylindrical shape with lateral disks perpendicular thereto. The spool 44 may be attached to the inner walls of the flotation housing 22 through holders 48. The fishing line 46 may be wound on the spool 44. The fishing line 46 may be made of polyvinylidene fluoride, nylon, or any other resistant material. In a preferred embodiment, the fishing line may be an eight-ft fishing line. The fishing line 46 may protrude from the flotation housing 22 through the bottom housing 26. The hook 42 may be made of a metal material. In one embodiment the hook 42 may be a circle hook, a treble hook, or any other suitable hook. In a preferred embodiment, the hook 42 may be made of a metal material, plastic, or any other resistant material.

The electronic assembly 60 may include a light 62, a battery 66, a transmitter 65, a processor 63, a sensor 67, and a positioning system 64. In a preferred embodiment, the positioning system 64 is a Global Positioning System (GPS). In one embodiment the battery 66, the transmitter 65, the positioning system 64, and the processor 63 may be contained within an inner housing located within the flotation housing 22.

Figure 3:
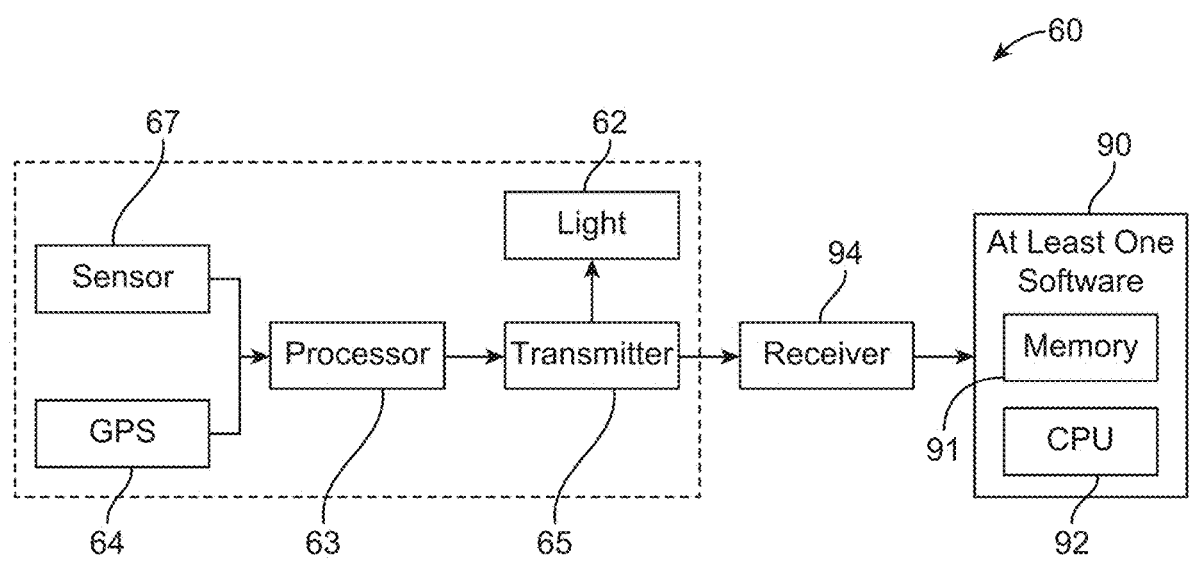
FIG. 3 illustrates a schematic view of the electronic assembly 60.

The sensor 67 may be attached to the reel assembly 40. In a preferred embodiment the sensor 67 may be a motion sensor. The sensor 67 may be adapted to sense motion of the reel assembly 40. As best illustrated in FIG. 3, the sensor 67 may sense the motion of the fishing line 46 when being unwounded from the spool 44. The processor 63 may process data from the sensor 67 to actuate the transmitter 65. The transmitter 65 may actuate the light 62 to blink and send a signal to a receiver 94 located on an external device 99. The external device 99 may preferably be a mobile device. The external device 99 may include at least one software 90, a memory 91, and a central processing unit 92. The at least one software 90 may display an alert signal in the external device 99. The central processing unit 92 may process signals received from the transmitter 65. In one embodiment the memory 91 may store events of motion from the sensor 67.

In a preferred embodiment, the present invention 10 may be placed floating in water having the fishing line 64 extending downwards and the sensor 67 may sense when spool 44 rotates. The spool 44 rotates, the light 62 turns on and an alert signal is displayed in external device 99. The positioning system 64 may indicate the position of the present invention 10. The position of the present invention may be displayed in the external device 99. It should be understood that the present invention 10 may include a plurality of lights 62 or a plurality of hooks 42. In one embodiment the present invention 10 may include a retraction system to wound or unwound the spool 44 rotates. In a preferred embodiment, the light 62 is a light-emitting diode. The battery 66 may be a rechargeable battery. The battery 66 may power the electronic assembly 60.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A jug fishing with lights, comprising:
    a housing assembly, wherein said housing includes a flotation housing having a cylindrical shape, said housing assembly is configured to float, said housing assembly includes a bottom housing, said bottom housing is attached to a bottom wall of the flotation housing the bottom wall of the flotation housing has an opening said bottom housing being tubular and having a diameter smaller than a diameter of the flotation housing, said bottom housing attached to the bottom wall of the flotation housing at an opening thereof;
    a reel assembly, wherein said reel assembly includes a spool and a fishing line, wherein said spool is attached to inner walls of said flotation housing, said fishing line is wound on said spool, said fishing line extending downwards through the opening of the bottom wall and the tubular bottom housing; and
    an electronic assembly, wherein said electronic assembly includes a light emitting diode, a motion sensor, a transmitter, a processor, and a Global Positioning System, said motion sensor is attached to said spool, said motion sensor is configured to detect rotation in said spool to turn on said light emitting diode and actuate the transmitter to send a signal to an external mobile device to display an alert signal and a position of the jug fishing with lights via at least one software on the external mobile device, said processor configured to process data from the motion sensor to actuate the transmitter, said Global Positioning System configured to provide real-time location data to the external mobile device.

2. The jug fishing with lights set forth in claim 1, wherein said housing assembly includes a light housing, said light housing is attached to a top end of said flotation housing, said light housing protecting said light.

3. The jug fishing with lights set forth in claim 2, wherein said light is a light-emitting diode.

4. The jug fishing with lights set forth in claim 1, wherein said electronic assembly includes a rechargeable battery to power said motion sensor, said light emitting diode, said transmitter, said processor, and said Global Positioning System.

5. The jug fishing with lights set forth in claim 1, wherein said flotation housing is made of polyethylene foam.

6. A jug fishing with lights, comprising:
    a housing assembly, wherein said housing includes a flotation housing having a cylindrical shape, said housing assembly is configured to float, said housing assembly includes a tubular bottom housing attached to the bottom wall at an opening thereof, said tubular bottom housing having a diameter smaller than a diameter of the flotation housing;
    a reel assembly, wherein said reel assembly includes a spool and a fishing line, wherein said spool is attached to inner walls of said flotation housing, said fishing line is wound on said spool, said fishing line extending downwards through the opening of the bottom wall and the tubular bottom housing; and
    an electronic assembly, wherein said electronic assembly includes a light emitting diode, a transmitter, a processor, a Global Positioning System, and a motion sensor, said motion sensor is attached to said spool, said motion sensor is configured to detect rotation in said spool to turn on said light emitting diode, said transmitter is configured to send a signal to an external mobile device to display an alert signal in at least one software when said spool rotates, said processor configured to process data from the motion sensor to actuate the transmitter said Global Positioning System configured to provide real-time location data to the external mobile device.

7. A jug fishing with lights, consisting of:
    a housing assembly, wherein said housing includes a flotation housing, a light housing and a bottom housing, said flotation housing having a cylindrical shape, said flotation housing is configured to float, said flotation housing has a top wall and a bottom wall, said bottom wall having an opening, said bottom housing is attached to said bottom wall, said bottom housing being tubular and having a diameter smaller than a diameter of the flotation housing, said light housing has a conical shape;
    a reel assembly, wherein said reel assembly includes a spool and a fishing line, wherein said spool is attached to inner walls of said flotation housing, said fishing line is wound on said spool, said fishing line extends downwards from said spool and through said bottom housing; and
    an electronic assembly, wherein said electronic assembly includes a light emitting diode, a transmitter, a rechargeable battery, a processor, a Global Positioning System, and a motion sensor, said motion sensor is attached to said spool, said motion sensor is configured to detect rotation in said spool to turn on said light emitting diode, said transmitter is configured to send a signal to an external mobile device to display an alert signal in at least one software when said spool rotates, said rechargeable battery is configured to power said electronic assembly, said light emitting diode is enclosed within said light housing, said processor configured to process data from the motion sensor to actuate the transmitter, said Global Positioning System configured to provide real-time location data to the external mobile device.

\* \* \* \* \*